UNITED STATES PATENT OFFICE.

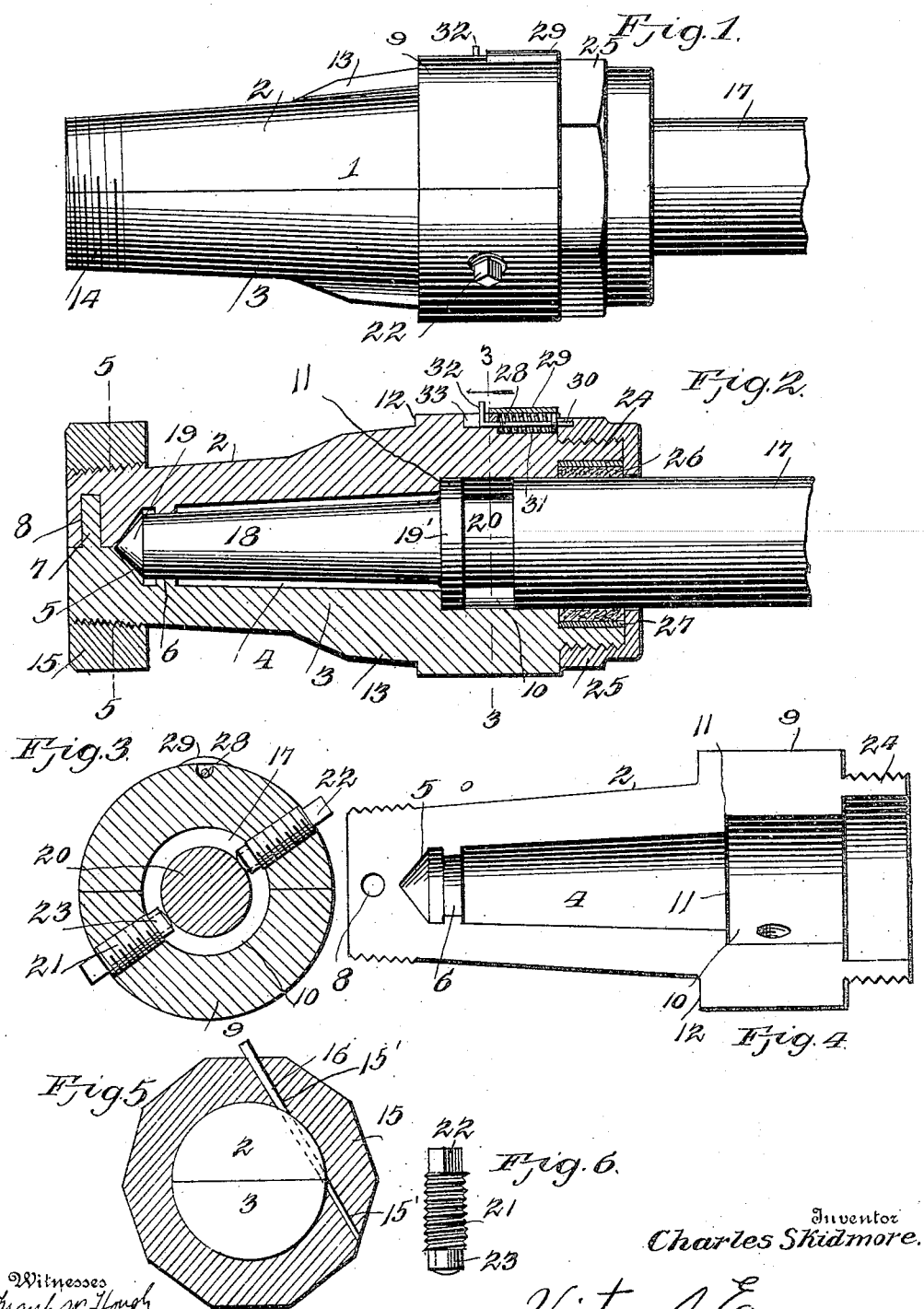

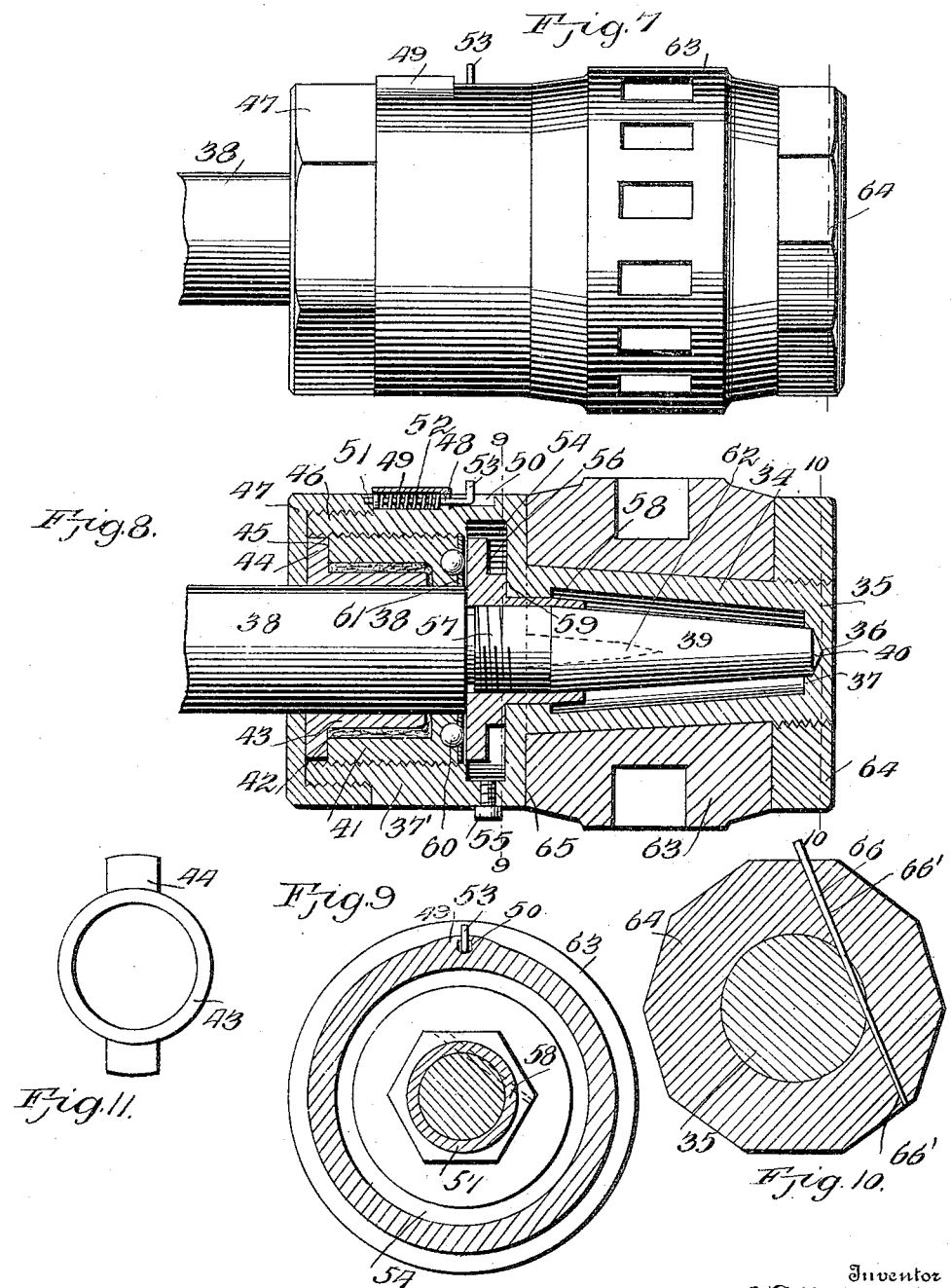

CHARLES SKIDMORE, OF HOMER, NEBRASKA, ASSIGNOR OF ONE-THIRD TO DANIEL B. STIDWORTHY AND ONE-THIRD TO FRANK B. BUCK-WALTER, OF HOMER, NEBRASKA.

JOURNAL-BEARING.

No. 817,676.　　　　　Specification of Letters Patent.　　　　Patented April 10, 1906.

Application filed September 16, 1905. Serial No. 278,740.

*To all whom it may concern:*

Be it known that I, CHARLES SKIDMORE, a citizen of the United States, residing at Homer, in the county of Dakota and State of Nebraska, have invented new and useful Improvements in Journal-Bearings, of which the following is a specification.

This invention relates to improvements in journal-bearings.

The object of the invention is to provide a journal-bearing adapted for general use and provided with means for securing a self-lubricating action and preventing the entrance to the bearing of dust, sand, and other foreign substances, the construction being such that the bearing may be used for a long period without the necessity of cleaning or replenishing it with lubricant.

Another object is to provide a bearing which permits easy rotation of the rotating part, which embodies an improved construction of bearing-surfaces, and which also permits of the ready substitution of new bearing parts for worn-out ones.

With these and other objects in view the invention consists of the novel construction, combination, and arrangement of parts hereinafter fully described, illustrated, and claimed, reference being had to the accompanying drawings, in which—

Figure 1 is a side elevation of a journal-bearing embodying my invention. Fig. 2 is a longitudinal section through the box thereof, the axle and spindle appearing in elevation. Fig. 3 is a cross-section on the line 3 3 of Fig. 2. Fig. 4 is an inner face view of one of the sections of the box. Fig. 5 is a cross-section on the line 5 5 of Fig. 2. Fig. 6 is a detail view of one of the fastenings for holding the box against endwise movement. Fig. 7 is a view similar to Fig. 1, showing a modification in the construction of the bearing. Fig. 8 is a longitudinal section of the same. Figs. 9 and 10 are cross-sections taken, respectively, on the lines 9 9 and 10 10 of Fig. 8; and Fig. 11 is a detail rear elevational view of the fixed bearing-sleeve employed in the construction shown in Figs. 7 to 10, inclusive.

Referring now more particularly to Figs. 1 to 6, inclusive, wherein the invention is shown as adapted for use in connection with the axle spindle and box of a vehicle or other wheel, the numeral 1 represents a box which is longitudinally divided or composed of matching sections 2 and 3, adapted to fit closely together. The meeting faces of these sections are suitably recessed to form a chamber 4, adapted to serve as a main oil or lubricant receptacle or chamber. Chamber 4 communicates at its outer end with a conical bearing-recess 5, between which and the chamber is a rib or bearing portion 6. The outer end of the box is solid and closed to prevent the entrance of dust, sand, and other foreign substances thereto, and the contiguous portions of the sections thereof are held in proper relation by interfitting connections, said connections comprising in the present instance a dowel-pin or projection 7, extending from the section 3 and entering a dowel-seat 8 in the section 2. The inner end of the box is enlarged, as shown at 9, and is formed with an auxiliary oil or lubricant receiving chamber 10, which is of greater diameter than the main lubricant-chamber, causing the production of an intervening shoulder 11, constituting a bearing-surface, as hereinafter described. The hub of the wheel (not shown) fits on the box outside of the enlarged portion 9, which latter forms an outer shoulder 12 to hold the same from inward movement, the box-sections being provided beyond said shoulder with fixed locking pins or keys 13 to engage the usual recesses in the hub and lock the same thereto. The outer ends of the box-sections are exteriorly threaded, as shown at 14, to receive a securing-nut 15, whereby the hub is secured against outward movement. This nut is formed with passages 15' to receive a tapered key 16, which crosses the bore of the nut at one side thereof and bears against the threads on the box to hold the nut against retrograde rotation. The axle 17 is provided with a tapered spindle 18, which occupies the chamber 4 and terminates in a conical outer end portion 19, which fits within the conical bearing-recess 5 and bears against the walls thereof. Adjacent to said recess the outer end of the spindle engages the bearing 6, thus adapting the hub to turn thereon without undue wear upon the conical bearing-surfaces. At the inner end of the tapered portion 18 the spindle is formed with a collar 19', spaced from the adjacent end of the axle 17, said collar coinciding in diameter with the axle to form an intervening annular groove 20. The outer end of the axle projects into the inner portion of the auxiliary lubricant-chamber 10, while the collar 19' occupies the outer portion thereof and bears against the shoulder or bearing-surface 11, thus forming a stop to limit the inward movement of the box and also prevent endwise thrust upon the bearing-surfaces 5 and 19, thus relieving the same from excess wear. Arranged at diametrically opposite points upon the sections 2 and 3 of the box are securing-screws 21, each having an outer angular operating-head 22, the inner ends of said screws projecting into the chamber 10 and bearing against the spindle between the collar 19' and adjacent end of the axle. The said inner ends of the screws carry friction-rollers 23, which bear against the inner face of the collar 19 and the bearing-surface formed by the contiguous outer end of the axle, and thus serve to hold the axle from outward endwise movement, while reducing friction during the revolution of the same about the spindle. The inner end of the enlargement 9 is formed with an inwardly-projecting externally-threaded flange 24 to receive a cap-nut 25, which forms a chamber to receive absorbent packing material 26, backed by a retaining ring or washer 27. This packing material and ring are held in position by the cap-nut, and the packing serves to prevent the entrance of dust and dirt at the inner end of the bearing while absorbing the oil or lubricant working from the chamber 10 and keeping the outer end of the axle lubricated. In order to hold the cap-nut 25 against retrograde rotation, a sliding latch 28 is provided, said latch being arranged to slide in the outer end wall of a housing 29, arranged in a longitudinal groove or recess in the enlarged portion 9 of the box and having an inner locking end 30 to seat within a recess in the nut to lock the same from backward movement. This latch is normally projected by a coiled spring 31 and is provided at its outer end with a finger-piece 32, projecting beyond the groove 33 in the box, so that it may be readily grasped to slide the latch for releasing the nut when occasion requires. It will be apparent that the sections 2 and 3 of the box will be held closely assembled by the hub, the dowel-pin 7 and seat 8, the securing-nut 15, and the cap-nut 25, and it will be understood that during the rotation of the box oil will feed from the chambers 4 and 10 throughout the length of the box and inclosed portion of the axle and spindle, thus keeping the bearing or contacting surfaces constantly lubricated. As the outer end of the box is solid and closed and the space between the axle and inner end of the box maintained dust-proof by the packing 26, it will be clear that access of dust, sand, and other foreign substances to the box will be prevented, thus avoiding contamination of the oil or lubricant and adapting the box to run for a long period without the necessity of cleaning the parts or refilling the chambers 4 and 10 with lubricant. The lubricant employed, which may be oil or oil and graphite, is supplied to the chamber 10 through the opening occupied by one of the retaining-screws 21 and feeds therefrom to the chamber 4, the application of the screw closing the opening and preventing the escape of lubricant.

In the construction shown in Figs. 7 to 11, inclusive, the numeral 34 designates the axle-box, which may be formed of a single piece, or sectional, as in the construction already described. This box has an outer closed or solid rim 35, formed with a conical bearing-recess 36, the portion 35 being chilled to adapt it to form a hardened bearing member. The box is provided with a main lubricant-chamber 37, closed at its outer extremity by the end 35. The box is provided with an annular rear enlargement 37' to receive the outer end of the axle 38, which latter is provided with a tapering spindle 39, projecting into the chamber 37 and formed with a conical outer end 40, fitting within the recess 36. The enlargement 37' is interiorly screw-threaded to receive a bushing-sleeve 41, the inner or rear side of which is hollow or chambered to form a receptacle for absorbent packing 42, and also to receive a fixed bearing-sleeve 43, formed of hardened metal and contacting with the outer end of the axle 38. This sleeve 43 is detachably secured in position and held from independent rotation by providing it with diametrically opposite lugs 44, entering recesses 45, formed in the rear edge of the sleeve 41, the bearing-sleeve thus being adapted to turn with the bushing-sleeve and box, while the packing 42 prevents access of dust, dirt, and other foreign substances at the rear portion of the box. The inner end of the enlargement 37' is reduced to form a flange 46, which is externally screw-threaded to receive a cap-nut 47. This cap-nut closes the rear or inner end of the box and holds the sleeve 43 from outward movement. In order to hold the cap-nut when screwed home from retrograde rotation, a spring-actuated latch 48 is provided, said latch being arranged to slide in the outer end wall of a housing 49, occupying a portion of a groove or recess 50, formed in the enlargement 37'. This latch corresponds to the latch previously described and has a locking end 51 adapted to engage and seat in the nut 47. The latch is projected by a coiled spring 52, disposed in the housing, and is provided with an angularly-bent outer end 53, movable in the outer portion of the recess 50 and projecting therefrom, so as to be readily grasped to permit the latch to be retracted against the pressure of the spring and release the cap-nut, so that the latter may be removed when occasion requires. The outer end of the enlargement 37' is recessed to form an auxiliary oil-chamber 54, which is supplied with oil from the exterior through an inlet closed by a screw-plug or other suitable closure 55, and arranged within this chamber is a nut 56, which engages the screw-threaded inner end 57 of the spindle 39 and bears against the outer surface of the axle 38 and the outer surface of the box enlargement 37' at the point of juncture of the same with the body portion of the box 34. This nut engages said portion and serves as a means to prevent endwise movement of the box on the axle and spindle, thus relieving the conical bearing-surfaces 36 and 40 from end thrust and excess wear resulting therefrom. The nut 56 is locked in any suitable manner from rotation on the part 57 and is provided with a hardened bearing-sleeve 58, which is engaged by an annular bearing rib or portion 59, disposed on the box at the inner end of the chamber 37 and between the same and the chamber 54. The sleeves 43 and 58 are adapted to withstand the major part of the wear resulting from the movement of the box and may be readily removed and new parts substituted therefor when occasion requires in an obvious manner. If desired, the outer portion of the bushing-sleeve 41 may be formed with pockets to receive antifriction-balls 60 to move in contact with the inner face of the nut 56, said balls being held in position by a retaining disk or washer 61, suitably secured to said bushing-sleeve and having openings through which portions of the balls may project to engage said nut. The body portion of the axle in this embodiment of the invention is provided with pins or keys 62, similar to the corresponding parts 13 of the construction shown in Figs. 1 to 6, inclusive, and fitting in recesses in the wheel-hub 63, the outer end of the axle-box being threaded to receive a securing-nut 64, whereby the hub which bears at its inner end against the shoulder 65, formed by the outer end of the enlargement 37, is held from outward movement on the box. The nut 64 is held from retrograde movement by a tapered key 66, fitting in registering bores or passages 66', formed therein, and pressing firmly against the threads on the outer end of the box 34.

From the foregoing description, taken in connection with the accompanying drawings, the construction and mode of operation of the invention will be readily understood, and it will be seen that it provides a journal-bearing which is adapted for general use, which will effectually prevent the entrance of dust, dirt, and other foreign substances, which is adapted to permit free movement of the rotating part, which embodies an improved construction of bearing-surfaces and means whereby those bearing parts which are most subject to wear may be conveniently removed when worn out and new ones substituted therefor, and which is adapted to be used for a long period without the necessity of cleaning the parts or introducing a new supply of oil or lubricant.

Having thus described the invention, what is claimed as new is—

1. In a journal-bearing, a box having an outer conical bearing-recess, a main lubricating-chamber and auxiliary lubricating-chamber, a wall of said auxiliary chamber forming a bearing-surface, a spindle having a conical end engaging said conical recess, and a bearing portion on the spindle disposed in the auxiliary chamber and engaging the bearing-surface thereof, the coacting bearing-surfaces serving to prevent endwise thrust of the turning part, thereby relieving the conical bearing-surfaces from excess wear.

2. In a journal-bearing, the combination of a box formed with a main lubricating-chamber, a conical bearing-recess at the outer end of said chamber and an enlarged auxiliary lubricating-chamber at the inner end thereof, a spindle having a conical end fitting in said recess and a bearing portion disposed in said auxiliary chamber and bearing against a wall thereof to limit the relative longitudinal movement of the parts and relieve the conical surfaces from endwise thrust, and a dust-proof closure for the inner end of the box.

3. In a journal-bearing, the combination of an axle, an axle-spindle, said spindle being provided with a conical outer end, a box receiving the axle and spindle and provided with main and auxiliary lubricating-chambers and an intervening bearing-surface, the outer end of the box being closed and formed with a conical recess to receive the conical end of the spindle, a dust-proof closure for the inner end of the box, and a bearing member on the axle-spindle disposed in the auxiliary chamber and engaging said bearing-surface of the box to hold the latter from endwise movement on the axle and spindle and thus relieve the conical bearing-surfaces from end thrust.

4. In a journal-bearing, an axle and spindle, the latter having a conical outer end, a box inclosing the same, said box having a closed outer end formed with a conical recess receiving the outer end of the spindle, and a threaded inner flange, an oil-chamber to receive the spindle, an auxiliary oil-chamber to receive the outer end of the axle, and a cap engaging said flange to close the inner end of the box, the spindle being provided with a bearing member within the auxiliary chamber, said bearing serving to hold the box against inward endwise movement on the spindle, whereby the bearing relation between the conical bearing-surfaces is maintained.

In testimony whereof I affix my signature in presence of two witnesses.

CHARLES SKIDMORE.

Witnesses:
FRANK B. BUCKWALTER,
JAMES L. BLANCHARD.